United States Patent [19]
Tokita et al.

[11] Patent Number: 4,958,374
[45] Date of Patent: Sep. 18, 1990

[54] METHOD OF CHECKING PATTERN AND APPARATUS THEREFOR

[75] Inventors: Masakazu Tokita, Fuji; Izumi Kasahara, Numazu, both of Japan

[73] Assignee: Toshiba Machine Company, Ltd., Tokyo, Japan

[21] Appl. No.: 227,796

[22] Filed: Aug. 3, 1988

[30] Foreign Application Priority Data

Mar. 4, 1988 [JP] Japan ................................. 63-49761

[51] Int. Cl.[5] .............................................. G06K 9/00
[52] U.S. Cl. ....................................... 382/8; 358/106; 382/22
[58] Field of Search .................... 382/8, 50, 27, 22; 358/106

[56] References Cited

U.S. PATENT DOCUMENTS

4,532,650  7/1985  Wihl et al. ............................ 382/8
4,771,468  9/1988  Batchelder et al. .................. 582/8
4,805,123  2/1989  Specht et al. ........................ 382/8

Primary Examiner—Leo H. Boudreau
Attorney, Agent, or Firm—Oblon, Spivak, McClelland, Maier & Neustadt

[57] ABSTRACT

In a method of checking pattern, a pattern of a target is photographed and an image of the check pattern is converted into a check image data which is represented by pixel data and density data. A design data for forming the pattern of the target is also converted into a reference image data corresponding to the check image data. The check and reference image data is processed and converted into check and reference gradient vector data, respectively. The check gradient vector data is compared with the reference gradient vector data in a respective corresponding pheripheral pixel data, and its pheripheral pixel data so that the defect is detected.

16 Claims, 12 Drawing Sheets

|   | 2 | 3 | 4 | 5 | 6 | 7 |
|---|---|---|---|---|---|---|
| 7 | 0 | 2 | 15 | 14 | 15 | 2 |
| 6 | 0 | 10 | 39 | 36 | 42 | 15 |
| 5 | 0 | 9 | 40 | 8 | 40 | 17 |
| 4 | 0 | 9 | 39 | 36 | 42 | 18 |
| 3 | 0 | 1 | 14 | 16 | 18 | 7 |
| 2 | 0 | 0 | 0 | 0 | 0 | 0 |

METHOD OF CHECKING PATTERN AND APPARATUS THEREFOR

BACKGROUND OF THE INVENTION

Field of the Invention

The present invention relates to a method and apparatus for checking fine defects occurring in a pattern to be checked (check pattern) by comparing the check pattern with a reference pattern, and, more particularly, to a method of and apparatus for checking defects occurring in a two-dimensional pattern such as a circuit pattern of a printed circuit board, an IC, or the like.

A conventional method of checking defects occurring in a two-dimensional pattern is binary comparison checking which checks defects by comparing binary check pattern data with binary reference pattern data. According to this method, a check pattern is photographed by an image pickup apparatus. Then, the image formed by light rays reflected by or transmitted through the check pattern is divided into small pixels. The density or brightness (to be simply referred to as a density of a pixel hereinafter) of reflected or transmitted light rays constituting each pixel is converted into a binary value. Thus, the image is converted into binary pattern data as an aggregation of the pixels having values 1 and 0. Similarly, a reference pattern is converted into binary pattern data according to the image or design data. Both the binary pattern data obtained in this manner are compared with each other, and defects in the check pattern are checked. In the binary comparison checking, when an image of a check pattern is divided into pixels, a defect region is not completely divided into pixels. In other words, the image is only divided into pixels such that part of the defect region occupies part of a pixel. Therefore, defects cannot be accurately detected. That is, in the binary comparison checking, theoretically, a defect smaller than several pixels cannot be detected. Such a problem can be solved by minimizing a pixel unit. However, as the pixel unit is decreased, a data capacity is increased, and hence a longer time is required to process data. Even if all the defects may be defined by pixels, it is apparent that defects cannot be accurately checked when a positioning error is present between check pattern data and reference pattern data. That is, when a positioning error, i.e., a positional deviation, is present between the check pattern data and the reference pattern data, this error must be corrected. In correction, a given pixel of the check pattern data is required to be compared with a corresponding pixel of the reference pattern data and each of its peripheral pixels in addition to comparison between the pixels of the check pattern data and the corresponding pixels of the reference pattern data. For example, when a positioning error corresponding to one pixel is present between the check pattern data and the reference pattern data, a given pixel of the check pattern data is compared with a corresponding pixel of the reference pattern data and each of its peripheral pixels. If the given pixel of the check pattern data coincides with any one of the corresponding pixels of the reference pattern data and the peripheral pixels, it is determined that no defect is present in the given pixel of the check pattern data. According to such a method of correcting a positioning error, however, when defects successively occur in a given pixel of check pattern data and its adjacent pixels, any one of the pixels might not be judged defective, and hence a defect having a size smaller than twice that of a positioning error might not be found. In any case, during binary comparison checking, fine defects in a check pattern cannot be accurately detected.

SUMMARY OF THE INVENTION

It is an object of the present invention to provide a method of checking fine defects occurring in a check pattern by comparing the check pattern with a reference pattern, which can accurately detect at least a defect having a size corresponding to one pixel even when a positioning error is present between the check pattern and the reference pattern, and an apparatus therefor.

According to the present invention, there is provided a method of checking a defect occurring in a check pattern by comparing the check pattern with a reference pattern, comprising the steps of:

generating check and reference image data respectively constituted by pixel data representing check and reference patterns by pixels and density data representing densities of the pixels;

converting the image data of the check and reference patterns into density gradient vector data of the pixels of the check and reference patterns; and detecting a defect included in the check pattern data by comparing the converted density gradient vector data of the pixels of the check and reference patterns with each other.

In addition, according to the present invention, there is provided an apparatus for checking a defect occurring in a check pattern by comparing the check pattern with a reference pattern, comprising:

means for generating check and reference image data respectively constituted by pixel data representing check and reference patterns by pixels and density data representing densities of the pixels;

means for converting the image data of the check and reference patterns into density gradient vector data of the pixels of the check and reference patterns; and means for detecting a defect included in the check pattern data by comparing the converted density gradient vector data of the pixels of the check and reference patterns with each other.

DETAILED DESCRIPTION OF THE PREFERRED EMBODIMENTS

A method of checking defects occurring in a check pattern by comparing the check pattern with a reference pattern according to an embodiment of the present invention will be described below with reference to FIGS. 1 to 5. According to the method of checking defects of the present invention, a check pattern is photographed by an image pickup apparatus in the same manner as in the conventional binary comparison checking. The check pattern is divided into pixels $(x_i, y_j)$ defined by positional coordinates $(x,y)$. In addition, the intensity or brightness (to be simply referred to as the density of a pixel hereinafter) of reflected or transmitted light rays constituting each pixel is represented by a multiple-valued numeral, e.g., 0 to $2^6$ (64). The resultant density distribution is represented by spatial coordinates $f(x_i, y_j)$ as a function of the positional coordinates. Check pattern including such positional coordinates $(x_i, y_j)$ and spatial coordinates $f(x,y)$ is obtained by processing in a computer. Similarly, the reference pattern data of a reference pattern can be obtained from the image or design data by computer processing as data including positional coordinates $(x,y)$ associated with pixels and spatial coordinates $g(x_i, y_j)$ associated with densities.

Figure 1:
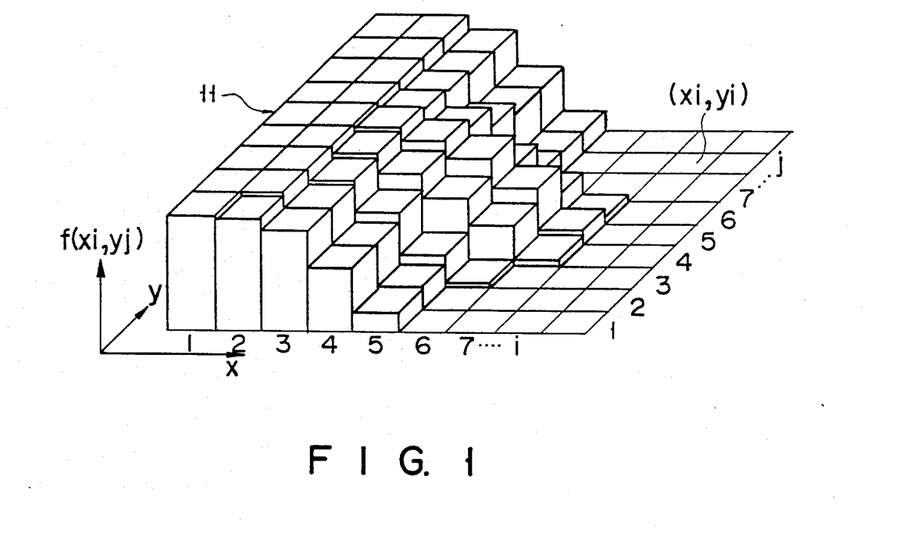
FIG. 1 is a view showing check pattern data converted from the image of a pattern to be checked by a method of checking defects occurring in a check pattern by comparing the check pattern with a reference pattern according to an embodiment of the present invention.

FIG. 1 shows check pattern data of part of image 11, which is formed by light rays transmitted through a check pattern and is represented by a multiple-valued scheme. Referring to FIG. 1, reference symbols x and y denote spatial coordinates; and $f(x_i, y_j)$, a density distribution (the amount of transmitted light rays) of pixel $(x_i, y_j)$. In this case, gradient vectors A corresponding to density gradients grad f obtained from the multiple-valued check pattern data are calculated by the following equation:

$$A(x_i, y_i) = \left[ \sum_{K=j-1}^{j+1} \{g(x_{i+1}, y_k) - g(x_{i-1}, y_k)\}, \sum_{l=i-1}^{j+1} \{g(x_l, y_{j+1}) - g(x_l, y_{j-1})\} \right]$$

Figure 2:
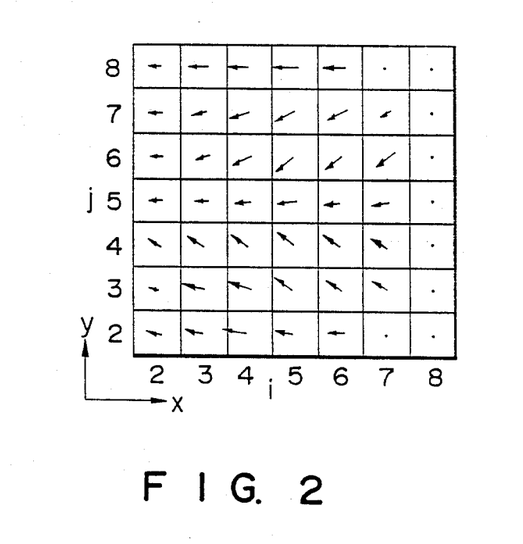
FIG. 2 shows a map of gradient vector data obtained from the check pattern data in FIG. 1.

FIG. 2 shows the map of gradient vectors A.

Figure 3:
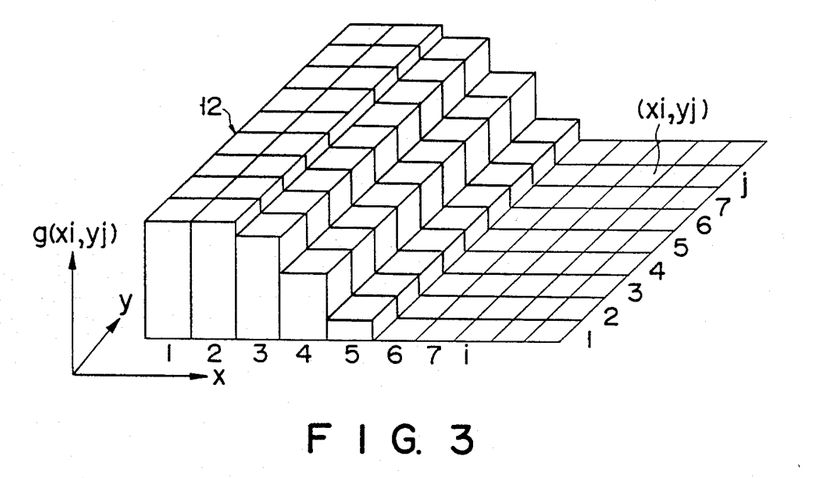
FIG. 3 is a view showing reference pattern data converted from the image of a reference pattern corresponding to the check pattern data in FIG. 1 and used in the method of checking defects occurring in a check pattern by comparing the check pattern with a reference pattern according to the present invention.

FIG. 3 shows reference pattern data of part of image 12 formed by light rays transmitted through a reference pattern corresponding to the above check pattern. The reference pattern data is obtained from design data of the check pattern and is represented by the multiple-valued scheme. Referring to FIG. 3, reference numerals x and y denote spatial coordinates; $g(x_i, y_j)$, a density distribution of pixel $(x_i, y_j)$. In this case, gradient vectors B corresponding to gradients grad g obtained from the multiple-valued reference pattern data are calculated by the following equation:

$$B(x_i, y_i) = \left[ \sum_{K=i-1}^{j+1} \{g(x_{i+1}, y_k) - g(x_{i-1}, y_k)\}, \sum_{l=i-1}^{j+1} \{g(x_l, y_{j+1}) - g(x_l, y_{j-1})\} \right]$$

Figure 4:
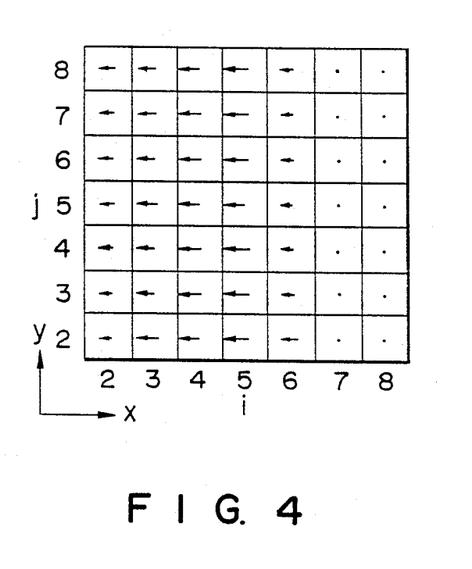
FIG. 4 is a map showing gradient vector data obtained from the reference pattern data in FIG. 3.

FIG. 4 shows the map of the gradient vectors B.

Figure 5:
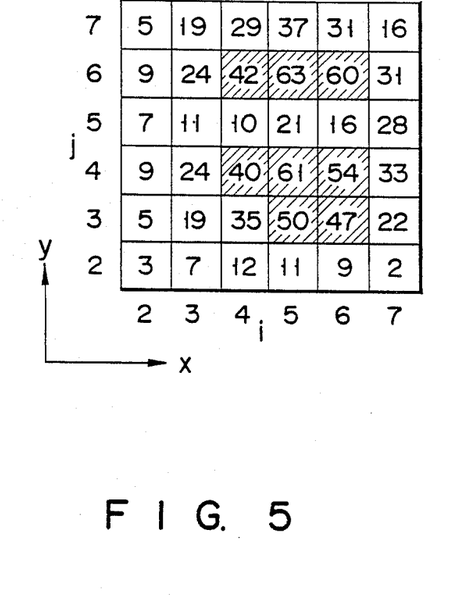
FIG. 5 shows two-dimensional coordinates of multiple-valued gradient vector differences calculated by comparing gradient vector data associated with the check pattern and the reference pattern in FIGS. 2 and 4.

Gradient vectors A and B of density distribution $f(x_i, y_j)$ of image 11 of the multiple-valued check pattern data and of density distribution $g(x_i, y_j)$ of image 12 of the multiple-valued reference pattern data are compared with each other. In this case, gradient vector $A(x_i, y_j)$ is compared with gradient vector $B(x_i, y_j)$ and its adjacent gradient vectors $(x_k, y_l)$ in consideration of a positioning error which may occur between the multiple-valued check pattern data and the multiple-valued reference pattern. Then, the minimum in the range of $k = i-1, i,$ and $i+1$ to $l = i-1, j,$ and $i+1$ of the absolute values of the vector differences:

$$|B(x_k, y_l) - A(x_i, y_j)|$$

is set to be $C(x_i,y_j)$, and hence minimum value $C(x_i,y_j)$ of the gradient vector differences is obtained. Minimum values $C(x_i,y_j)$ are obtained from the gradient vector data in FIGS. 2 and 4. FIG. 5 shows the resultant values.

Predetermined threshold value V is set with respect to minimum value $C(x_i,y_j)$ of the above gradient vector differences. When a relationship between a given pixel and threshold value V is established as follows:

$$C(x_i,y_j) \geq V$$

it is determined that "a defect is present" in a check pattern. If, for example, V=40, hatched portions shown in FIG. 5 are determined to be defects.

As is apparent from the comparison between FIGS. 1 and 3, even a defect having an area corresponding to two pixels can be completely detected in a check pattern by the present invention, unlike in the conventional method wherein densities are compared in consideration of only a positioning error corresponding to $\pm 1$ pixel.

Figure 6:
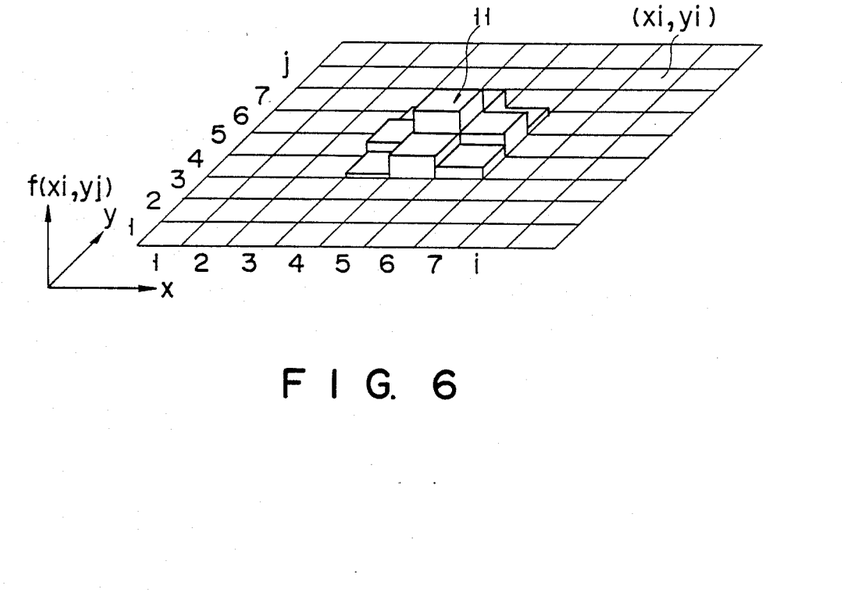
FIG. 6 is a view showing check pattern data converted from the image of another pattern to be checked by a method of checking defects occurring in a check pattern by comparing the check pattern with a reference pattern.
Figure 7:
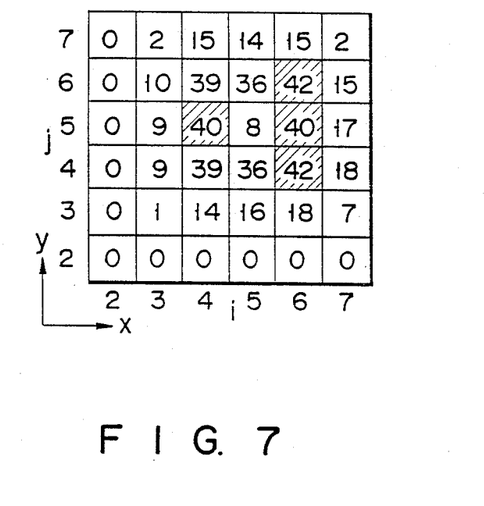
FIG. 7 shows two-dimensional coordinates of multiple-valued gradient vector differences calculated by comparing gradient vector data associated with the check pattern data in FIG. 6 and corresponding reference pattern data.

In addition, FIG. 6 shows another check pattern of the present invention, wherein an isolated defect having an area corresponding to about one pixel is present in image 11 of multiple-valued check pattern data. The overall height of the image of reference pattern data corresponding to the check pattern data is 0. When minimum value $C(x_i,y_j)$ of the gradient vector differences is obtained in the same manner as described above, values shown in FIG. 7 are obtained. If threshold value V is 40 (V=40), pixels corresponding to hatched portions in FIG. 7 are detected as defects.

Generally, in comparison between the pixel shown in FIGS. 1 and 3, if only corresponding density distributions $f(x_i,y_j)$ and $g(x_i,y_j)$ of images 11 and 12 of the multiple-valued check and reference pattern data are simply compared with each other, defects cannot be accurately checked. For example, the density of pixel $(x_5,y_5)$ of the check pattern in FIG. 1 is compared with the densities of nine pixels $(x_4,y_4)$, $(x_4,y_5)$, $(x_4,y_6)$, $(x_5,y_4)$, $(x_5,y_5)$, $(x_5,y_6)$, $(x_6,y_4)$, $(x_6,y_5)$, and $(x_6,y_6)$ of the reference pattern data in FIG. 3 in consideration of a positioning error corresponding to $\pm 1$ pixel. In this case, the densities of the respective pixels are independently compared with each other. Since the density of pixel $(x_5,y_5)$ of the check pattern data substantially corresponds to the densities of pixels $(x_4,y_4)$, $(x_4,y_5)$, and $(x_4,y_6)$ of the reference pattern data, pixel $(x_5,y_5)$ of the check pattern is determined to be "not defect". Similarly, its peripheral pixels are determined to be "not defect". In the method of checking defects according to the present invention, however, a gradient vector represents the degree and direction of an gradient of an area, and a value for representing a relationship of a given pixel and its peripheral pixels, i.e., representing the shape of a density distribution. Therefore, for example, pixel $(x_5,y_5)$ of the check pattern in FIG. 1 is determined to be "protruded". This determination is made by comparing the above pixel with its peripheral pixels. In contrast to this, there is no "protruded" pixel in the reference pattern data in FIG. 3, and hence the two data are determined to be different. Such determination can be made even if a large positioning error is present. That is, since a gradient vector is a value for representing the shape of a density distribution, comparison between gradient vectors means that partial shapes of the density distributions of the two patterns are compared. Therefore, when a shape which does not exist in reference pattern data appears in check pattern data, the difference between the two pattern data can be found even if a relatively large positioning error is present.

In the above embodiment, for example, gradient vector A obtained from density distribution $f(x_i,y_j)$ of the image of the multiple-valued check pattern data shown in FIG. 1 may be calculated by another equation, e.g., the following equation using Sobel method:

$$\begin{aligned}A(x_i, y_i) = &[\{f(x_{i+1}, y_{j-1}) + 2f(x_{i+1}, y_j) + \\ &f(x_{i+1}, y_{j+1}) - f(x_{i-1}, y_{j-1}) - \\ &2f(x_{i-1}, y_j) - f(x_{i-1}, y_{j+1})\}, \\ &\{f(x_{i-1}, y_{j+1}) + 2f(x_i, y_{j+1}) + \\ &f(x_{i+1}, y_{j+1}) - f(x_{i-1}, y_{j-1}) - \\ &2f(x_i, y_{j-1}) - f(x_{i+1}, y_{j-1})\}]\end{aligned}$$

Gradient vector B can be obtained in the same manner. In addition, as a comparison method, only directions of both vectors A and B can be compared.

Furthermore, in the method of checking a pattern according to the above-described embodiment, when densities are gradually changed, even a large defect may not be detected. Therefore, if the direct binary comparison checking or the multiple-value comparison checking according to the conventional method is used in combination with the method of the present invention, further accurate checking can be realized.

In the method of checking defects according to the above embodiment, pixel vectors $A(X_i,Y_j)$ and $B(X_i,Y_j)$ of interest are compared with each other to check a defect. However, the gradient vector of pixel $(x_i,y_j)$ of interest of the check and reference pattern data, and its peripheral pixels $(x_{i-1},y_j)$, $(x_{i+1},y_j)$, $(x_{i-1},y_{j-1})$, $(x_{i+1},y_{j-1})$, $(x_{i-1},y_{j+1})$, $(x_{i+1},y_{j+1})$, $(x_i,y_{j-1})$, and $(x_i,y_{j+1})$ are compared with each other as comparison between area shapes to check a defect. Precision in checking can be improved by checking defects by comparison between area shapes. A method of checking defects by comparison between area shapes will be described below with reference to FIGS. 8 to 22.

Figure 8:
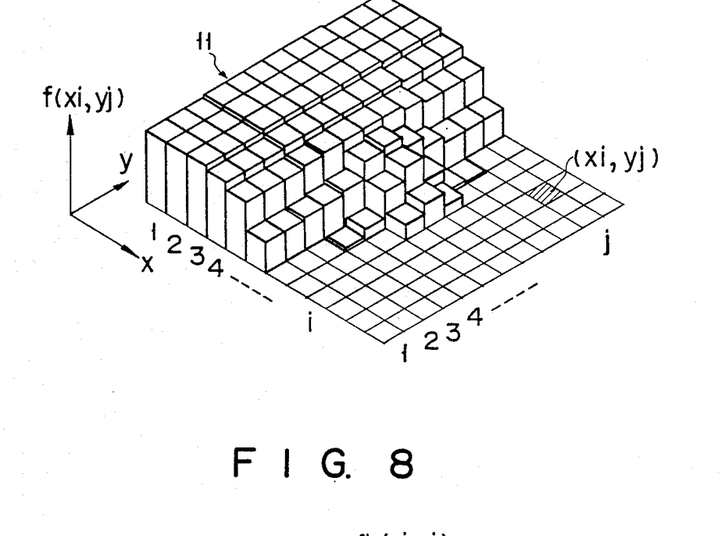
FIG. 8 is a view showing check pattern data converted from the image of a pattern to be checked by a method of checking defects occurring in a check pattern by comparing the check pattern with a reference pattern according to another embodiment of the present invention.

FIG. 8 shows check pattern data (represented by the multiple-valued scheme) of part of image 11 formed by light rays transmitted through a check pattern, in the same manner as in FIG. 1. Referring to FIG. 8, reference numerals x and y denote spatial coordinates; and $f(x_i,y_j)$, a density distribution (an amount of transmitted light rays) of pixel $(x_i,y_j)$. In this case, gradient vectors A corresponding to grad f obtained from image 11 of the multiple-valued check pattern data are calculated by the following equation:

$$A(x_i,y_j) = [\{(f(x_{i+1},y_j) - f(x_{i-1},y_j)\},\\ \{f(x_i,y_{j+1}) - f(x_i,y_{j-1})\}]$$

Figure 9:
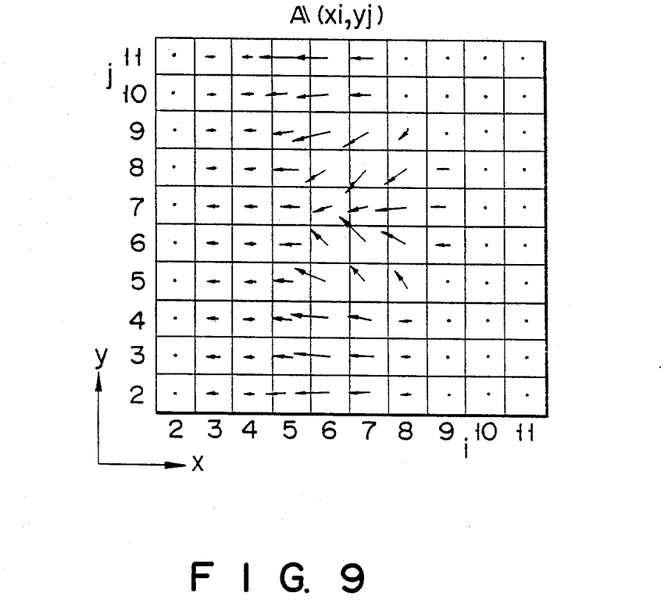
FIG. 9 shows a map of gradient vector data obtained from the check pattern data in FIG. 8.

FIG. 9 shows the map of the calculated values.

Figure 10:
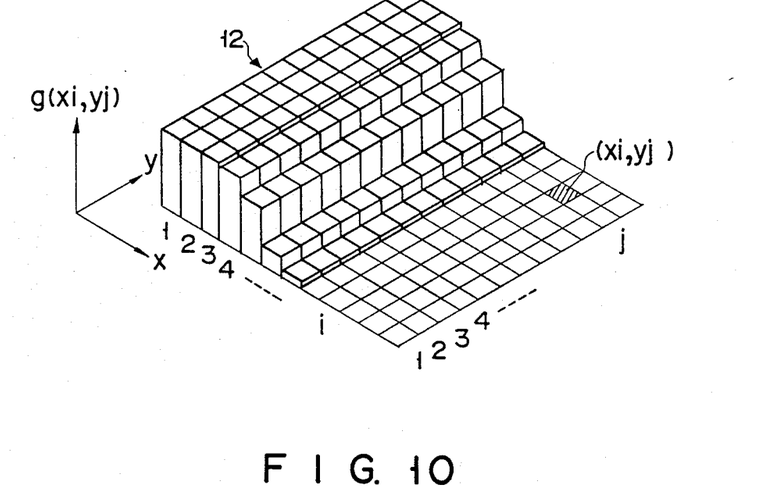
FIG. 10 is a view showing reference pattern data converted from the image of a reference pattern corresponding to the check pattern data in FIG. 8 and used in the method of checking defects occurring in a check pattern by comparing the check pattern with a reference pattern according to still another embodiment of the present invention.

FIG. 10 shows reference pattern data of part of image 12 which is formed by light rays transmitted through a reference pattern corresponding to the above check pattern and which is obtained from design data of the check pattern using the multiple-valued scheme. Referring to FIG. 10, reference symbols x and y denote spatial coordinates; $g(x_i,y_j)$, a density distribution of pixel $(x_i,y_j)$. In this case, gradient vectors B corresponding to grad g obtained from the image of the multiple-valued reference pattern are calculated by the following equation:

$$B(x_i,y_j) = [\{g(x_{i+1},y_j) - g(x_{i-1},y_j)\},$$
$$\{g(x_i,y_{j+1}) - g(x_i,y_{j-1})\}]$$

Figure 11:
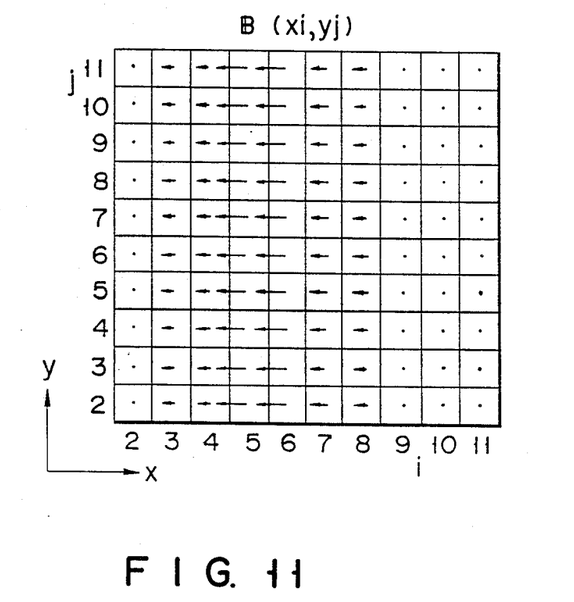
FIG. 11 shows a map of gradient vector data obtained from the reference pattern data in FIG. 10.

FIG. 11 shows the map of the calculated values.

Gradient vectors A and B of density distributions $g(x_i,y_j)$ of images 11 and 12 of the multiple-valued check and reference pattern data are compared with each other.

In this comparison, gradient vectors A and B obtained by the above equation are not compared with each other in one-to-one correspondence. Instead of this operation, a vector of pixel $(x_i,y_j)$ and its eight peripheral pixels, i.e., a total of nine pixels, are compared with their corresponding 9 pixels. For example, assuming that two sets of nine vectors are respectively set as $A_1, A_2, A_3 \ldots A_9$, and $B_1, B_2, B_3 \ldots B_9$, then, each pair of vectors such as $A_1$ and $B_1$, $A_2$ and $B_2$, $A_3$ and $B_3 \ldots A_9$ and $B_9$ are compared in one-to-one correspondence. Then, the mean value of absolute values of the vector difference is obtained as follows:

$$C = \frac{1}{9} \sum_{i=1}^{9} |B_i - A_i|$$

This mean value represents the vector difference between the pixel of interest and the corresponding pixel. In other words, the pixels of the check pattern data and the reference pattern data are compared with each other in consideration of the shape of the area corresponding to $3\times3=9$ pixels around a given point, i.e., a pixel of interest.

If the equation for obtaining the mean value of the vector difference described above is transformed into an expression in consideration of general spatial coordinates of the check area, it can be represented by:

$$C(x_i, y_j) = \frac{1}{9} \sum_{l=j-1}^{j+1} \sum_{K=i-1}^{i+1} |B(x_k, y_l) - A(x_k, y_l)|$$

where $|B(x_i, y_j) - A(x_i, y_j)| =$ $$\sqrt{\begin{array}{l}[\{f(x_{i+1}, y_j) - f(x_{i-1}, y_j)\} - \{g(x_{i+1}, y_j) - g(x_{i-1}, y_j)\}]^2 + \\ [\{f(x_i, y_{j+1}) - f(x_i, y_{j-1})\} - \{g(x_i, y_{j+1}) - g(x_i, y_{j-1})\}]^2\end{array}}$$

With this operation, comparison between area shapes of pixels $(x_i,y_j)$ of interest is completed. In addition, in consideration of a positioning error between the check pattern and reference pattern, adjacent areas shifted by $-1$ pixel must be compared.

More specifically, $$C(x_i, y_j) = \frac{1}{9} \sum_{l=j-1}^{j+1} \sum_{K=i-1}^{i+1} B(x_k, y_l) - A(x_{k+m}, y_{l+n})$$

Figure 12:
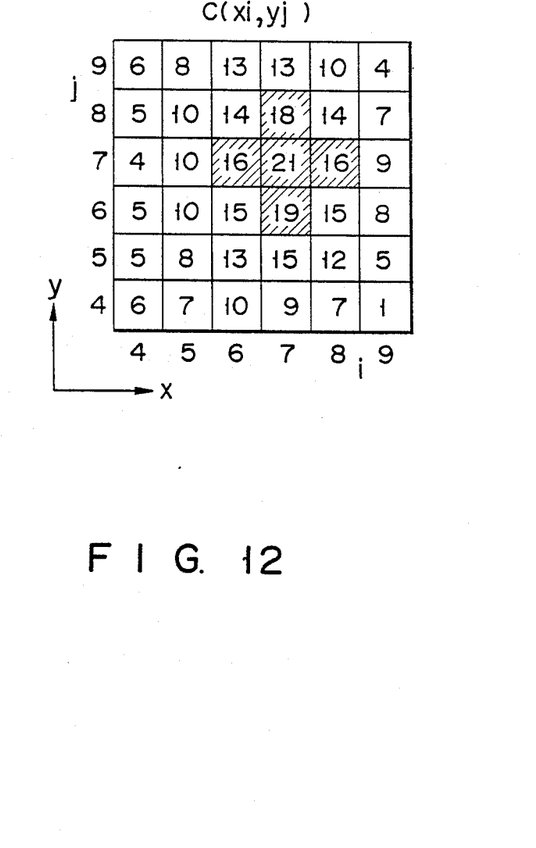
FIG. 12 shows two-dimensional coordinates of multiple-valued gradient vector differences calculated by comparing gradient vector data associated with the check and reference patterns respectively shown in FIGS. 9 and 11.

Then, nine values of C are obtained in the range of $m=-1, 0$, and $+1$ to $n=-1, 0$, and $+1$. The minimum value of the values is determined to be $C(x_i,y_j)$ of the central pixel at this time. This is a method including positioning of patterns in area comparison. FIG. 12 shows values $C(x_i,y_j)$ obtained from FIGS. 8 to 11.

According to this method, threshold value V is set with respect to minimum value C(x,y) of the gradient vector differences. When a relationship between a give pixel and threshold value V is established as follows:

$$C(x_i,y_j) \geq V$$

then, it is determined that "a defect is present" in the check pattern. For example, if $V=16$, hatched portions in FIG. 12 are determined to be defects.

Therefore, as shown in FIG. 8, when a defect having an area corresponding to two pixels is present in check pattern data, such a defect cannot be detected by the conventional method of directly comparing densities in consideration of a positioning error corresponding to $\pm 1$ pixel. However, in the method of checking defects according to the present invention, such a defect can be completely detected.

Figure 13:
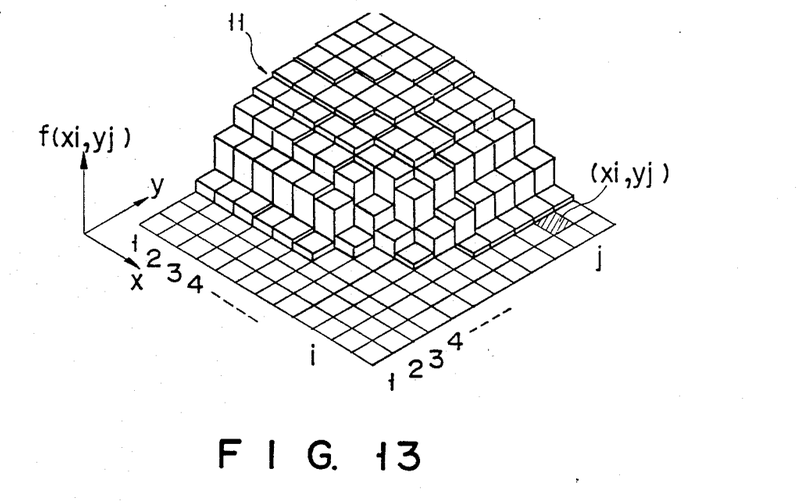
FIG. 13 is a view showing check pattern data converted from the image of a check pattern to be checked by a method of checking defects occurring in a check pattern by comparing the check pattern with a reference pattern according to still another embodiment of the present invention.
Figure 14:
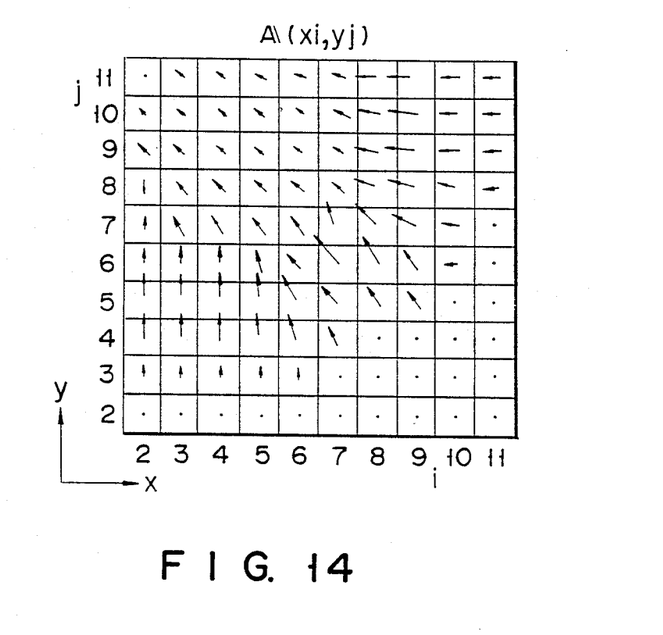
FIG. 14 shows a map of gradient vector data obtained from the check pattern data in FIG. 13.
Figure 15:
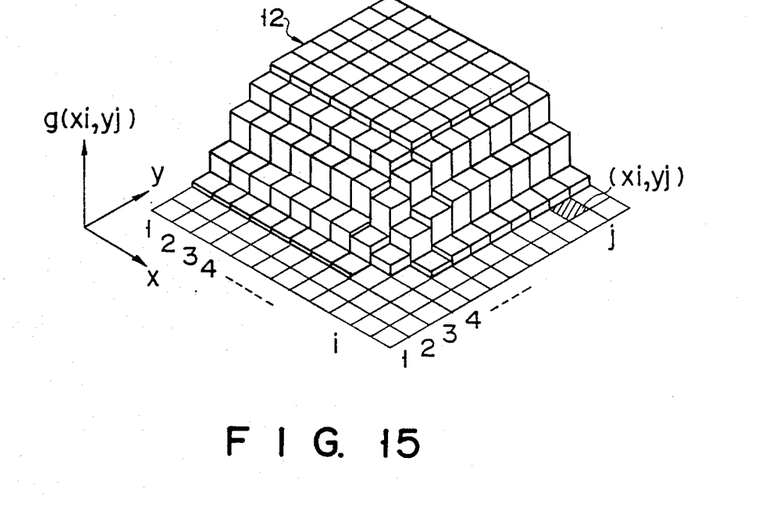
FIG. 15 is a view showing reference pattern data converted from the image of a reference pattern corresponding to the check pattern data in FIG. 13 and used in the method of checking defects in a check pattern by comparing the check pattern with a reference pattern according to still another embodiment of the present invention.
Figure 16:
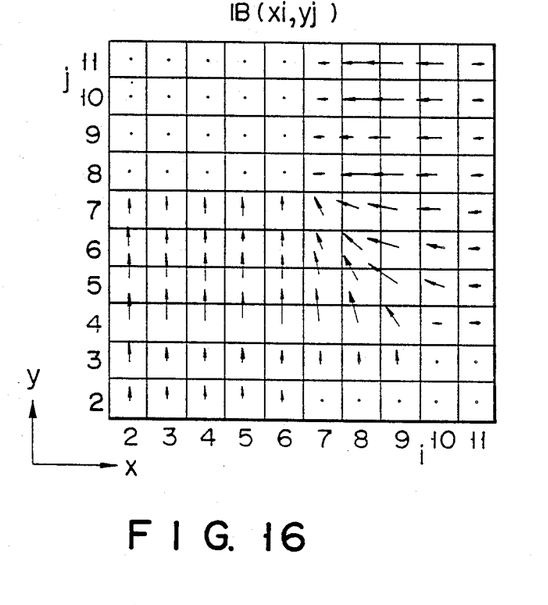
FIG. 16 shows a map of gradient vector data obtained from the reference pattern data in FIG. 15.

FIGS. 13 to 16 show still another embodiment of the present invention. When a defect is present in a corner portion of image 11 of check pattern data as shown in FIG. 13, and, especially this fine defect has a small area corresponding to about two pixels, since similar density gradient vectors are present within the rang of $\pm 1$ pixel, if the vectors are compared in one-to-one correspondence, the vector difference is reduced upon comparison including positioning. For this reason, the defect may be not detected. If, however, area shapes of $3\times3$, i.e., a 9-pixel area including peripheral eight pixels, are compared with each other, the defect can be completely detected, as in the method of the present invention.

In the above embodiment, for example, gradient vector A obtained from density distribution $f(x_i,y_j)$ of the image of the multiple-valued check pattern data shown in FIG. 8 may be calculated by another method, e.g., the Sobel method, as described above. Gradient vector B can also be obtained in the same manner as described above.

In addition, in the embodiments of the present invention, area shapes of vectors are compared by using all the vectors of $3\times3=9$ pixels. However, even if approximate area comparison is performed using the vector of a central pixel and the vectors of $\pm 1$ pixel in two directions perpendicular thereto, i.e., a total of five vectors, so as to simplify hardware or software of the checking apparatus, the same functions and effects as those in the above case can be obtained.

In the embodiments of the present invention, for example nine vectors are used to compare area shapes and the mean value of the absolute values of vector differences is given by:

$$C = \frac{1}{9} \sum_{i=1}^{9} |B_i - A_i|$$

Then, this mean value is used as the vector difference of a portion corresponding to the pixels of interest. However, instead of the above equation, for example, the following equation may be used:

$$C = \sqrt{\frac{1}{9} \sum_{i=1}^{9} (B_i - A_i)^2}$$

An apparatus for checking defects using the abovedescribed checking method will be described below with reference to FIGS. 17 to 19. The apparatus of checking defects shown in FIGS. 17 to 19 employs not only the gradient comparison method of comparing density gradients but also the level comparison method of comparing density levels of each pixel, thereby utilizing the advantages of both the methods.

Figure 17:
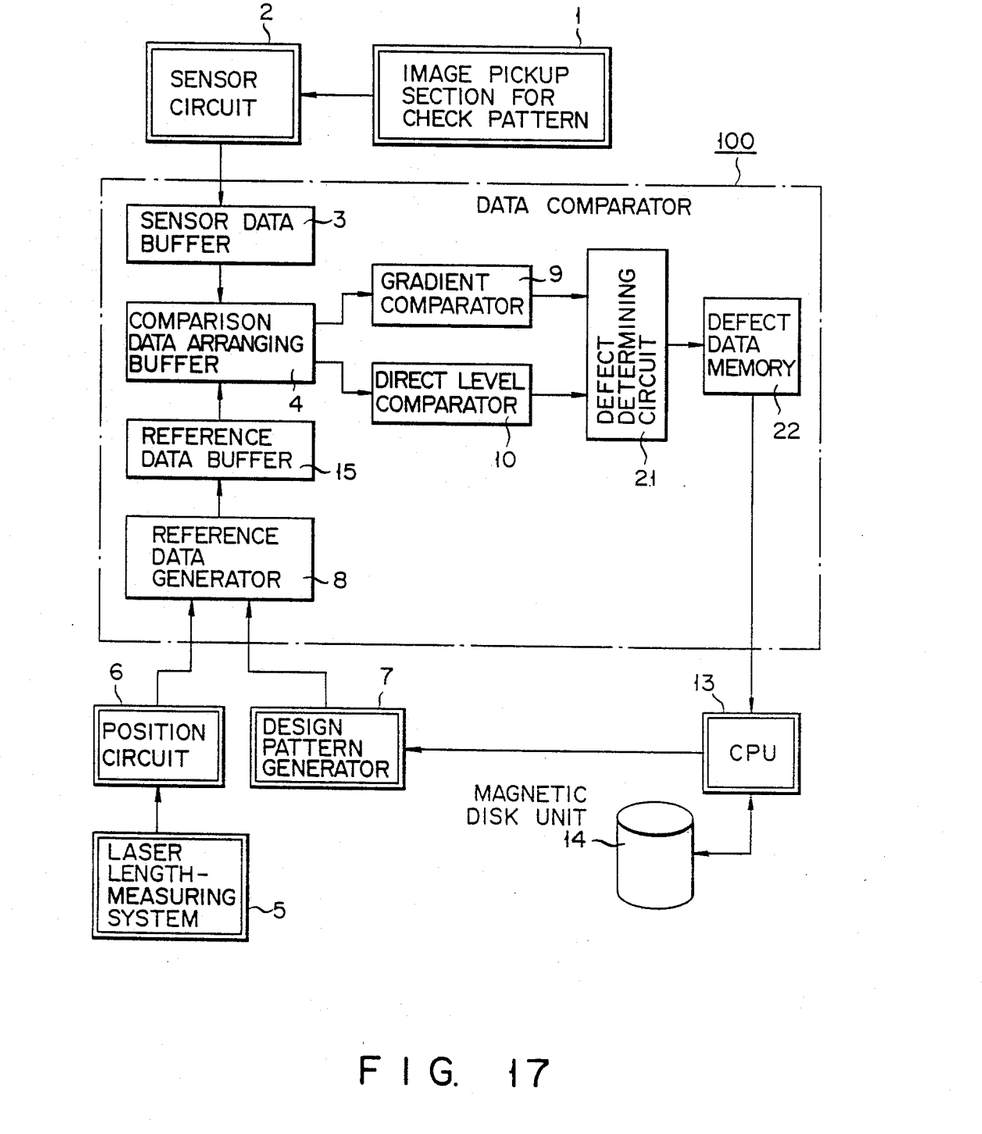
FIG. 17 is a block diagram showing an apparatus for checking defects occurring in a check pattern by comparing the check pattern with a reference pattern according to an embodiment of the present invention.

FIG. 17 is a circuit diagram showing a pattern checking apparatus according to an embodiment of the present invention. For example, a glass mask or the like on which a circuit pattern of an LSI is formed as a check pattern is photographed by check pattern image pickup section 1. This circuit pattern is converted into an electrical signal and is input to sensor circuit 2. The electrical signal of the circuit pattern is amplified by sensor circuit 2, A/D-converted, and stored in sensor data buffer 3 in data comparator 100 as multiple-valued data. This data is used as check pattern data.

The data which is used when the check pattern is formed is stored in a recording unit, e.g., magnetic disk unit 14. This data is transmitted to design pattern generator 7 under the control of central processing unit (to be referred to as a CPU hereinafter) 13, and is converted into, e.g., a bit pattern. This bit pattern is input to reference pattern data generator 8 in data comparator 100. At the same time, the bit pattern is detected by position detecting means, e.g., laser length-measuring system 5, for detecting positional data of the pattern when the check pattern is photographed. Then, the detected data is supplied to reference data generator 8 through position circuit 6. Data generator 8 generates reference pattern data (reference data) corresponding to the check pattern data on the basis of the pattern and positional data, and is stored in data buffer 15.

The check pattern data in sensor data buffer 3 and the reference data in reference data buffer 15 are simultaneously read out to comparison data arranging buffer 4. Comparison data arranging buffer 4 arranges both the data to be compared therein as two-dimensional data. FIG. 18 is a block diagram showing an arrangement of comparison data arranging buffer 4 in FIG. 17. Buffer 4 is mainly constituted by shift registers 41, 42, 43, 44, 45, 46, 47, and 48, and data registers D1 to D25, and S1 to S25. Accordingly, two-dimensionally arranged contents in data registers D1 to D25, and S1 to S25 are simultaneously output so that this especially the gradient comparison, which is described with reference to FIGS. 1 to 16, can be performed for each pixel at high speed. In addition, these output values are used for direct level comparison performed simultaneously with the gradient comparison.

Figure 18:
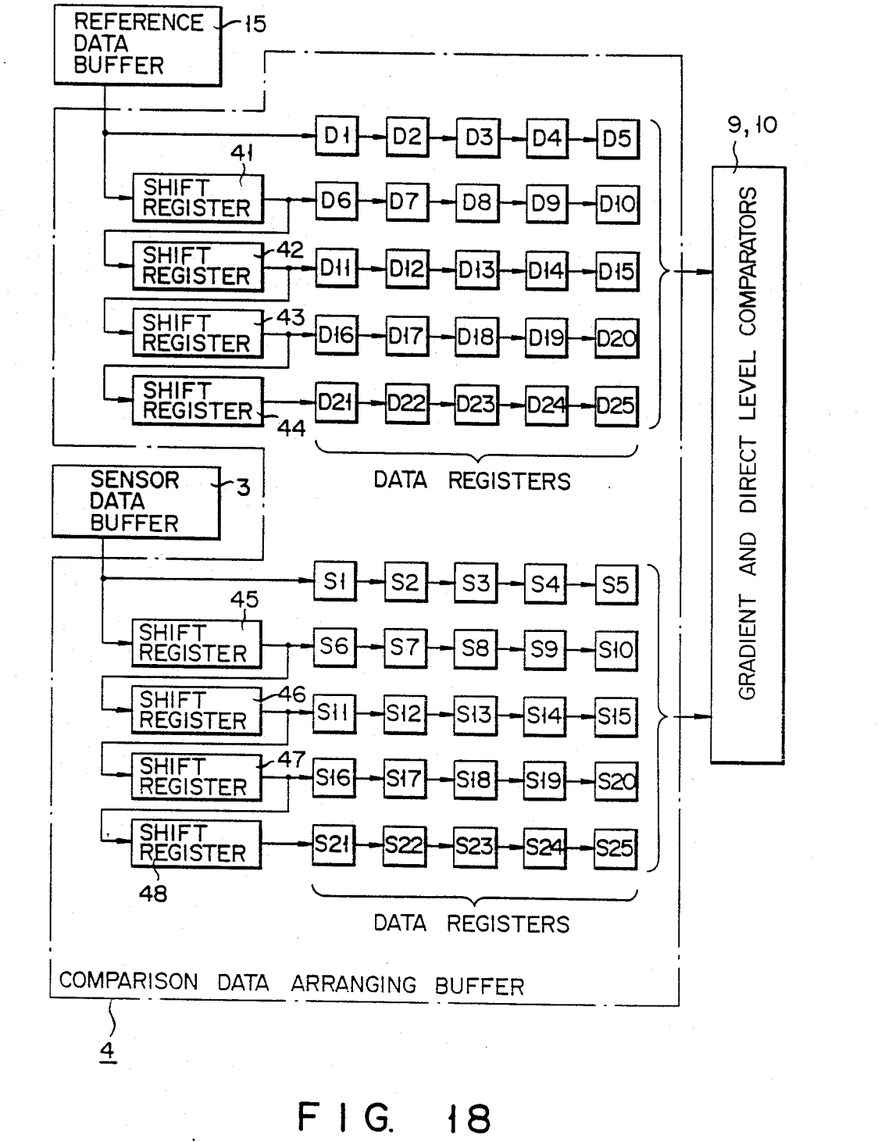
FIG. 18 is a block diagram showing a comparison data arranging buffer of the apparatus in FIG. 17.

Data output from comparison data arranging buffer 4 in FIG. 18 are simultaneously supplied to gradient comparator 9 and direct level comparator 10 of the next stage.

Figure 19:
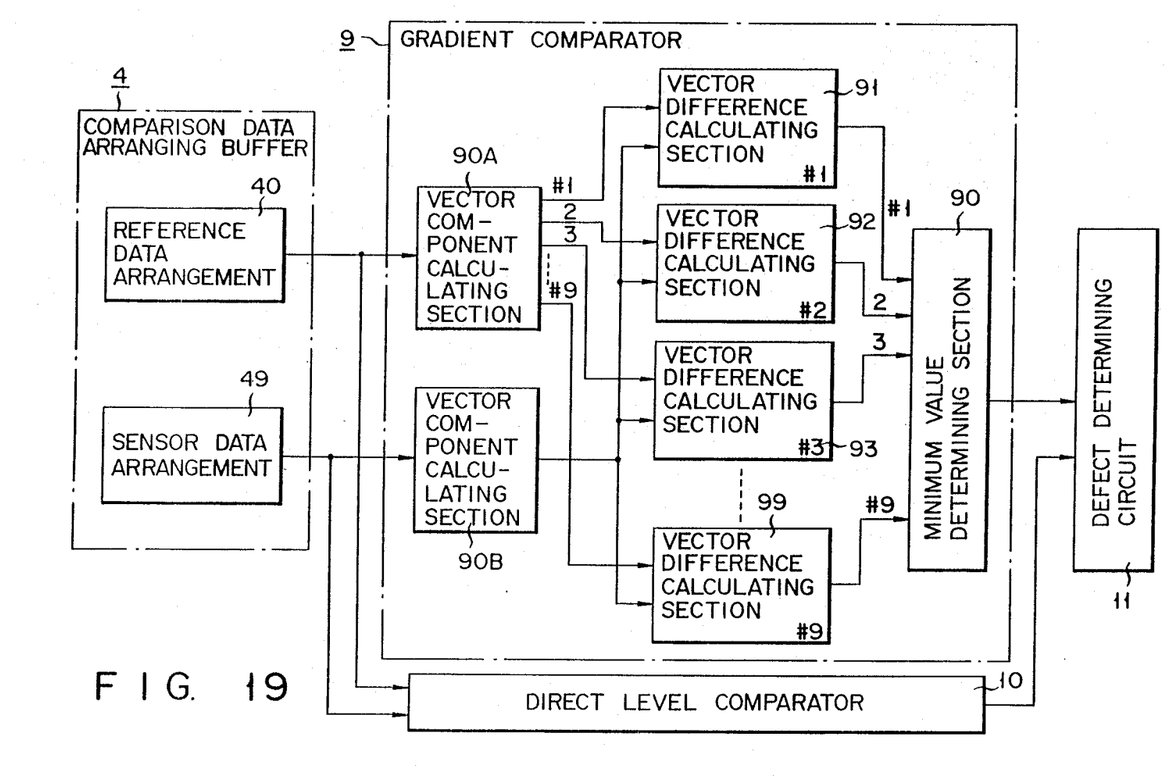
FIG. 19 is a block diagram showing a gradient comparator of the apparatus in FIG. 17.

FIG. 19 is a block diagram showing an arrangement of gradient comparator 9. Reference data arrangement 40 and sensor data (check pattern data) arrangement 49 are supplied from comparison data arranging buffer 4 to gradient comparator 9 and a vector component is calculated for every pixel. More specifically, when reference pattern data is to be obtained, vector components of central nine pixels of D7 to D9, D12 to D14, and D17 to D19 are calculated by using data registers D1 to D25 in FIG. 18. As an example of calculation, the following equations can be presented:

$$g_7(x, y) = (D8 - D6, D12 - D2) \quad (1)$$
$$g_8(x, y) = (D9 - D7, D13 - D3) \quad (2)$$
$$g_9(x, y) = (D10 - D8, D14 - D4) \quad (3)$$

$$g_{19}(x, y) = (D20 - D18, D24 - D14) \quad (4)$$

In contrast to this, when sensor pattern data is to be obtained, only a vector component of central pixel (S13) calculated in the same manner as in the above case:

$$f_{13}(x,y) = (S14, -S12, S18 - S8) \ldots \quad (5)$$

In this example, data registers S1 to S25 other than data registers D5, D25, S8, S12, S14, and S18 in FIG. 18 are not used, and hence may be omitted from the system. However, they are required for other calculations.

The calculation results in vector component calculating sections 90A and 90B are supplied to vector difference calculating sections 91 to 99 of the next stage, and nine vectors are calculated according to the following equations:

$$|f_{13}(x, y) - g_7(x, y)| = \quad (6)$$
$$\sqrt{\{(S14 - S12) - (D8 - D6)\}^2 + \{(S18 - S8) - (D12 - D2)\}^2}$$

$$|f_{13}(x, y) - g_8(x, y)| = \quad (7)$$
$$\sqrt{\{(S14 - S12) - (D9 - D7)\}^2 + \{(S18 - S8) - (D13 - D3)\}^2}$$

$$|f_{13}(x, y) - g_9(x, y)| = \quad (8)$$
$$\sqrt{\{(S14 - S12) - (D10 - D8)\}^2 + \{(S18 - S8) - (D14 - D4)\}^2}$$

$$\vdots$$

$$|f_{13}(x, y) - g_{19}(x, y)| = \sqrt{\{(S14 - S12) - (D20 - D18)\}^2 + \{(S18 - S8) - (D24 - D14)\}^2} \quad (9)$$

In this embodiment, vector difference calculating sections 91 to 99 are constituted by nine circuits, and the nine types of calculations are simultaneously performed. These results are further supplied to minimum value determining section 90, and the minimum value of the nine data is determined to be the result of gradient comparison. This value is then supplied to defect determining circuit 21. Such a multiple circuit arrangement is employed because the gradient comparison includes a dynamic alignment function for each pixel in a real time manner.

Direct level comparison is simultaneously performed with the gradient comparison. Each data from data registers D1 to D25, and S1 to S25 in FIG. 18 is supplied to direct level comparator 10. In the direct level comparison, subtractions are performed between data of data registers D and S, and the magnitude of a comparison result is judged. Direct level comparator 10 is mainly constituted by an adder/subtractor. For example, if direct level comparison for only a central pixel of the data arrangement in FIG. 18 is to be performed, only the following calculation is performed:

$$\text{dif.} = S13 - D13 \ldots \quad (10)$$

When comparison between mean values in a 3×3 pixel area is to be performed, a calculation is performed using the following equation:

$$\text{dif.} = \frac{1}{9}\{(S7 + S8 + S9 + S12 + S13 + S14 + S17 + S18 + S19) - (D7 + D8 + D9 + D12 + D13 + D14 + D17 + D18 + D19)\} \quad (11)$$

In any case, according to the circuit arrangement in FIG. 18, a plurality of comparisons of 1×1 to 5×5 pixel areas can be performed. In addition, comparison may be performed by calculation with weighting for each pixel.

Defect determining circuit 21 in FIG. 17 compares each data obtained by gradient comparison and direct level comparison is compared with a corresponding determination threshold value, and determines that the data is defective if the data exceed a set value. Then, the data is stored in defect data memory 22. In defect determination, a determination value may be changed in accordance with the shape (isolated, edge, corner, or the like) of a design pattern at the time of determination so that determination can be performed in accordance with an apparatus and an object to be checked. Especially, in direct level comparison, a set value (determination value) may be changed in units of comparison areas (e.g., in units of 1×1, 2×2, or 3×3 pixel areas) or for each level, i.e., white or black level so as to set an optimal determination threshold value.

The defect data stored in defect data memory 22 is read by CPU 13 later on, and then is stored in magnetic disk unit 14.

According to the above-described embodiment of the present invention, since the gradient comparison method and the direct level comparison method are simultaneously utilized, the drawbacks of both the methods can be compensated for each other, and defect detecting precision can be further improved.

More specifically, since the direct level comparison method is simultaneously used, (1) the shape of a relatively large defect can be accurately expressed in units of pixels, (2) a defect having a small density gradient can be detected without a failure, (3) discrimination between a white defect and a black defect can be made, and without degrading the advantageous features of the gradient comparison method, (4) even if a small positioning error exists, a pseudodefect tends not to occur, and a small defect can be detected.

According to the above-described apparatus of the present invention, when check pattern data is to be compared with reference pattern, each pattern data is two-dimensionally arranged in units of pixels, and a circuit is arranged such that both the direct level and gradient comparison methods can be performed. In addition, for a relatively large defect, defect detection mainly utilizing the direct level comparison method is performed, and for a small defect, defect detection utilizing the gradient comparison method is performed. Therefore, a pattern checking apparatus which can improve defect detecting precision regardless of a positional deviation of patterns can be provided.

What is claimed is:

1. A method of checking a defect occurring in a check pattern by comparing the check pattern with a reference pattern, comprising the steps of:

generating check and reference image data each including pixel data and density data, the pixel data representing pixels defining check and reference patterns and density data representing densities corresponding to the brightness of the pixels;

converting the image data of the check and reference patterns into density gradient vector data of the pixels of the check and reference patterns, the density gradient vector data including gradient vectors peculiar to the pixels and the gradient vector corresponding to an interest pixel being obtained from distribution of the densities of a plurality of the peripheral pixels located around the interest pixel; and detecting a defect included in the check pattern data by comparing the converted density gradient vector data of the pixels of the check and reference patterns with each other.

2. A method according to claim 1, wherein the step of generating the image data includes the step of converting design data defining the reference pattern into image data corresponding to the reference pattern.

3. A method according to claim 1, wherein the step of generating the image data includes the step of photographing the check pattern and converting the photographed image into image data.

4. A method according to claim 1, wherein the step of comparing the patterns includes the steps of setting said pixel of interest of the check pattern data, said pixel of interest of the reference pattern data corresponding to the pixel of interest of the check pattern data, and said plurality of peripheral pixels of the pixel of interest of the reference pattern data, and comparing gradient vector data of the pixel of interest of the check pattern data with gradient vector data of the pixel of interest and the plurality of peripheral pixels of the reference pattern data.

5. A method according to claim 4, wherein the step of comparing the patterns includes the steps of obtaining differences between the gradient vector data of the pixel of interest of the check pattern data and the gradient vector data of the pixel of interest and the peripheral pixels of the reference pattern data, and setting a minimum value of the differences.

6. A method according to claim 5, wherein the step of comparing the patterns includes the steps of comparing the minimum value of the differences with a predetermined value, and determining the minimum value smaller than the predetermined value to be a defect.

7. A method according to claim 1, wherein the step of comparing the patterns includes the steps of setting a pixel of interest and a plurality of peripheral pixels thereof of the check pattern data, a pixel of interest of the reference pattern data corresponding to the pixel of interest of the check pattern data, and a plurality of peripheral pixels of the pixel of interest of the reference pattern data, and comparing gradient vector data of the pixel of interest and the plurality of peripheral pixels of the check pattern data with gradient vector data of the pixel of interest and the plurality of peripheral pixels of the reference pattern data.

8. A method according to claim 6, wherein the step of comparing the patterns includes the steps of obtaining differences between the gradient vector data of the pixel of interest and the plurality of peripheral pixels of the check pattern data and the gradient vector data of the gradient vector data of the corresponding pixel of interest and the plurality of peripheral pixels of the reference pattern data, and obtaining a mean value of absolute values of the differences.

9. A method according to claim 8, wherein the step of comparing the patterns includes the steps of comparing the mean value of the absolute values with a predetermined value, and determining the mean value larger than the predetermined level to be a defect.

10. An apparatus for checking a defect occurring in a dark pattern by comparing the check pattern with a reference pattern, comprising:
means for generating check and reference image data each including pixel data and density data, the pixel data representing pixels defining check and reference patterns and density data representing densities corresponding to the brightness of the pixels;
means for converting the image data of the check and reference patterns into density gradient vector data of the pixels of the check and reference patterns, the density gradient vector data including gradient vectors peculiar to the pixels and the gradient vector corresponding to an interest pixel being obtained from distribution of the densities of a plurality of the peripheral pixels located around the interest pixel; and
means for defecting a defect included in the check pattern data by comparing the converted density gradient vector data of the pixels of the check and reference patterns with each other.

11. An apparatus according to claim 10, wherein said means for generating the image data includes means for photographing the check pattern and converting the photographed image into image data.

12. An apparatus according to claim 10, wherein said means for generating the image data includes means for storing design pattern defining the reference pattern, and means for converting the design data into image data of the reference pattern.

13. An apparatus according to claim 10, wherein said means for generating the image data includes means for photographing the check pattern and converting the check pattern into the image data, means for detecting the position of the check pattern when the check pattern is photographed and converting the position into positional data, means for storing design pattern defining the reference pattern, and means for converting the design pattern into image data of the reference pattern.

14. An apparatus according to claim 10, wherein said means for comparing the density gradient vector data includes first buffer means for arranging image data of the check pattern in units of pixels and temporarily storing said gradient vector data corresponding to the pixels, and second buffer means for reading out the image data of the reference pattern in response to the positional data, arranging the image data of the reference pattern in unit of pixels in accordance with a pixel arrangement of the image data of the check pattern, and temporarily storing gradient vector data corresponding to the pixels.

15. An apparatus according to claim 14, wherein said means for comparing the density vector data includes level comparing means for comparing a density level of each pixel of the check pattern data with a density level of each pixel of the reference pattern and generating a level comparison signal, and gradient comparing means for comparing the gradient vector of each pixel of the check pattern data with the gradient vector of each pixel of the reference pattern and generating a gradient comparing signal.

16. An apparatus according to claim 15, wherein said means for comparing the density gradient vector data includes means for comparing each of the level and gradient comparison signals with corresponding reference pattern signals, and determining a defect from comparison results.

* * * * *